United States Patent
Takahashi et al.

(10) Patent No.: US 10,203,666 B2
(45) Date of Patent: Feb. 12, 2019

(54) CELL CONTROLLER FOR FINDING CAUSE OF ABNORMALITY IN MANUFACTURING MACHINE

(71) Applicant: FANUC CORPORATION, Yamanashi (JP)

(72) Inventors: Hiromitsu Takahashi, Yamanashi (JP); Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/390,721

(22) Filed: Dec. 27, 2016

(65) Prior Publication Data

US 2017/0220008 A1     Aug. 3, 2017

(30) Foreign Application Priority Data

Jan. 29, 2016   (JP) ................................ 2016-016575

(51) Int. Cl.
    *G05B 13/02*     (2006.01)
    *G05B 23/02*     (2006.01)

(52) U.S. Cl.
    CPC ..... *G05B 13/0265* (2013.01); *G05B 23/0237* (2013.01); *Y02P 90/02* (2015.11); *Y02P 90/087* (2015.11); *Y02P 90/14* (2015.11); *Y02P 90/86* (2015.11)

(58) Field of Classification Search
    CPC . G05B 13/0265; G05B 23/0237; Y02P 90/02; Y02P 90/087; Y02P 90/14; Y02P 90/86
    USPC ....................................................... 700/117
    See application file for complete search history.

(56) References Cited

U.S. PATENT DOCUMENTS

| | | | |
|---|---|---|---|
| 6,882,962 B2 * | 4/2005 | Aoyama | ............ G05B 23/0229 340/635 |
| 7,127,325 B2 * | 10/2006 | Nagata | ................... B25J 9/1674 700/245 |
| 2001/0047504 A1 | 11/2001 | Aoyama | |
| 2004/0083010 A1 | 4/2004 | Nagata et al. | |

(Continued)

FOREIGN PATENT DOCUMENTS

| | | |
|---|---|---|
| CN | 102354204 A | 2/2012 |
| CN | 102870057 A | 1/2013 |
| CN | 104281143 A | 1/2015 |

(Continued)

*Primary Examiner* — Kenneth M Lo
*Assistant Examiner* — Sivalingam Sivanesan
(74) *Attorney, Agent, or Firm* — Hauptman Ham, LLP (57) ABSTRACT

A cell controller includes an inside information acquiring unit for acquiring the inside information of the plurality of manufacturing machines, and an inside information comparing unit which compares, with regard to a first manufacturing machine and a second manufacturing machine, which are selected by the comparison object selecting unit, first inside information and second inside information, which are acquired, and the inside information comparing unit extracting a difference therebetween. The cell controller also includes an abnormality cause finding unit for finding a cause of an abnormality that occurs in the first manufacturing machine or the second manufacturing machine, based on the difference, and an abnormality cause conveying unit for conveying the cause of the abnormality to the outside of the cell controller.

12 Claims, 3 Drawing Sheets

(56) References Cited

U.S. PATENT DOCUMENTS

2007/0192064 A1\* 8/2007 Nakamura ............ G06Q 10/06
702/185

FOREIGN PATENT DOCUMENTS

| DE | 60220998 T2 | 10/2007 |
|----|-------------|---------|
| JP | 5-77143 A | 3/1993 |
| JP | 2002-49414 A | 2/2002 |
| JP | 2004-202624 A | 7/2004 |
| JP | 2004-341822 A | 12/2004 |
| JP | 4739556 B2 | 8/2011 |

\* cited by examiner

CELL CONTROLLER FOR FINDING CAUSE OF ABNORMALITY IN MANUFACTURING MACHINE

RELATED APPLICATIONS

The present application claims priority to Japanese Patent Application Number 2016-016575 filed Jan. 29, 2016, the disclosure of which is hereby incorporated by reference herein in its entirety.

BACKGROUND OF THE INVENTION

1. Field of the Invention

The present invention relates to a cell controller for controlling a plurality of manufacturing machines constituting a manufacturing cell.

2. Description of the Related Art

In manufacturing factories, manufacturing machines, for example, machine tools or robots perform operations, such as, processing or welding of parts. In order to manufacture products, a plurality of manufacturing machines constitutes a manufacturing line, for example, a manufacturing cell. In this instance, the manufacturing machines constituting the manufacturing cell are controlled by a cell controller via a network communication. The cell controller drives each manufacturing machine based on commands from a production management device as a host computer.

In such a manufacturing cell, an abnormality occurs in a manufacturing machine, such as a robot, and thus, the manufacturing machine does not operate normally in some cases. Thus, the productivity reduces. In order to solve such a problem, various methods for early detection of abnormalities in manufacturing machines have been proposed.

For example, Japanese Patent Application Laid-open No. 2004-202624 discloses a device for collecting information from a plurality of robots connected via a network. Such a device predicts a robot which may break down, when a predetermined robot breaks down, by comparing the previously registered information on the robots with the real-time individual information on the robots. Japanese Patent Application Laid-open No. 2004-202624 also discloses that, based on the information on the robot predicted to break down, candidate parts necessary when the robot breaks down are extracted.

Japanese Patent No. 4739556 discloses an abnormality determining device having a simulator which uses a model identical to an actual robot, to reproduce the operation and state of the actual robot. This device compares the operation and state of the actual robot in response to an operation command with results of the reproduction made by the simulator, thereby determining whether an abnormality occurs in the operation and state of the actual robot.

In order to improve productivity, in general, when an abnormality occurs in a manufacturing machine, a cause of the abnormality should be early determined to quickly recover the manufacturing machine.

However, when the abnormality is caused by, for example, an improper setting or improper operation, it takes a lot of time to determine the cause of the abnormality.

In other words, the abnormality caused by an improper setting or improper operation can often be found by comparing the information obtained from a manufacturing machine that operates normally with the information obtained from a manufacturing machine in which the abnormality occurs. However, under present circumstances, a maintenance manager or a support engineer in a machinery manufacture needs to perform a series of operations including picking up the inside information of each manufacturing machine and comparing pieces of the inside information with each other, and accordingly, it takes a lot of time to determine the cause of the abnormality.

Thus, a technology for early detection of an abnormality which may be caused by the inside information of a manufacturing machine, such as an improper setting or an improper operation as described above, has been desired.

Note that, the device disclosed in Japanese Patent Application Laid-open No. 2004-202624 predicts a failure in a component of a manufacturing machine, such as a robot, but cannot predict the occurrence of an abnormality caused by an improper setting or an improper operation in a manufacturing machine, i.e., the inside information of the manufacturing machine. The same is true in the device disclosed in Japanese Patent No. 4739556. Further, in the device disclosed in Japanese Patent No. 4739556, if simulation errors occur when the simulator reproduces the operation and state of the actual robot in response to an operation command, the correctness of the results of abnormality determination reduces.

SUMMARY OF THE INVENTION

The present invention provides a cell controller which efficiently finds an abnormality caused by the inside information of a manufacturing machine.

According to a first aspect of the present invention, there is provided a cell controller for controlling a plurality of manufacturing machines constituting a manufacturing cell. The cell controller includes an inside information acquiring unit which is configured to acquire the inside information of the plurality of manufacturing machines, a comparison object selecting unit which is configured to select, when an abnormality occurs in a first manufacturing machine of the plurality of manufacturing machines, the first manufacturing machine and a second manufacturing machine which has components similar to those of the first manufacturing machine and which normally operates, from among the plurality of manufacturing machines, an inside information comparing unit which is compare, with regard to the first manufacturing machine and the second manufacturing machine, which are selected by the comparison object selecting unit, the first inside information of the first manufacturing machine and the second inside information of the second manufacturing machine, which are acquired by the inside information acquiring unit, and the inside information comparing unit extracting a difference therebetween, an abnormality cause finding unit which is configured to find a cause of an abnormality that occurs in the first manufacturing machine or a cause of an abnormality that may occur in the future, based on the difference between the first inside information and the second inside information, which is extracted by the inside information comparing unit, and an abnormality cause conveying unit which is configured to convey the cause of the abnormality, which is found by the abnormality cause finding unit, to the outside of the cell controller.

According to a second aspect of the present invention, in the cell controller according to the first aspect, the inside information of each manufacturing machine includes at least one of a drive parameter associated with driving of a manufacturing machine, a function parameter associated with the function of a manufacturing machine, an operation program to be executed by a manufacturing machine, and an operation command log obtained by recording, in time series, operation commands received to cause a manufacturing machine to perform a predetermined operation.

According to a third aspect of the present invention, the cell controller according to the second aspect further includes an abnormal portion correcting unit which is configured to correct, when at least one of the drive parameter, the function parameter, and the operation program is a cause of the abnormality, a portion having the abnormality.

According to a fourth aspect of the present invention, in the cell controller according to the third aspect, the operation command log is information obtained by recording, in time series, operator's operations, operation program executing processes, input of signals to the outside, or operation commands generated by input of signals from the outside.

According to a fifth aspect of the present invention, the cell controller according to the second aspect further includes an operation command complementing unit which is configured to complement, when a lack of either an operation command log in the first inside information or an operation command log in the second inside information causes the abnormality, an operation according to an operation command lacking in the operation command log, with respect to the manufacturing machine which lacks the operation command log.

According to a sixth aspect of the present invention, in the cell controller according to any of the first to fifth aspects, the comparison object selecting unit which is configured to refer to device configuration information representing components of a manufacturing machine, which is associated with each of the manufacturing machines, and compares pieces the device configuration information with each other, thereby selecting the first manufacturing machine and the second manufacturing machine.

According to a seventh aspect of the present invention, in the cell controller according to any of the first to fifth aspects, the comparison object selecting unit which is configured to select the first manufacturing machine and the second manufacturing machine, based on registration information obtained by previously correlating the first manufacturing machine and the second manufacturing machine, which are similar to each other.

According to an eighth aspect of the present invention, in the cell controller according to any of the first to seventh aspects, the inside information acquiring unit which is configured to acquire the inside information of the manufacturing machines at a predetermined interval.

According to a ninth aspect of the present invention, in the cell controller according to any of the first to eighth aspects, the cell controller further comprises a database which is configured to correlate the state of an abnormality that occurs in each of the manufacturing machines and a cause of the occurrence of the abnormality, and stores the same, and the abnormality cause finding unit is configured to refer to the database, thereby finding a cause of an abnormality that occurs in the first manufacturing machine, or a cause of an abnormality that may occur in the future.

According to a tenth aspect of the present invention, the cell controller according to the ninth aspect further includes a database updating unit which is configured to reflect in the database, the state of an abnormality that occurs in either the first manufacturing machine or the second manufacturing machine, and a difference between the first inside information and the second inside information, which is extracted by the inside information comparing unit and which causes the abnormality.

According to an eleventh aspect of the present invention, in the cell controller according to the ninth aspect, the cell controller is one of a plurality of cell controllers, and further comprises a database sharing unit for sharing the database with the other cell controllers.

According to a twelfth aspect of the present invention, the cell controller according to the ninth aspect further includes a learning instrument which is configured to perform machine learning using the information stored in the database, the acquired inside information of each of the manufacturing machines, and the device configuration information representing components of each of the manufacturing machines, in order to update the information stored in the database.

BRIEF DESCRIPTION OF THE DRAWINGS

These objects, features, and advantages of the present invention and other objects, features, and advantages will become further clearer from the detailed description of typical embodiments illustrated in the appended drawings.

DETAILED DESCRIPTION

Embodiments of the present invention will be described below with reference to the drawings. In the following figures, similar members are designated with the same reference numerals. These figures are properly modified in scale to assist the understanding thereof. Further, the embodiments illustrated in the drawings are examples for carrying out the present invention, and the present invention is not limited to the illustrated embodiments.

Figure 1:
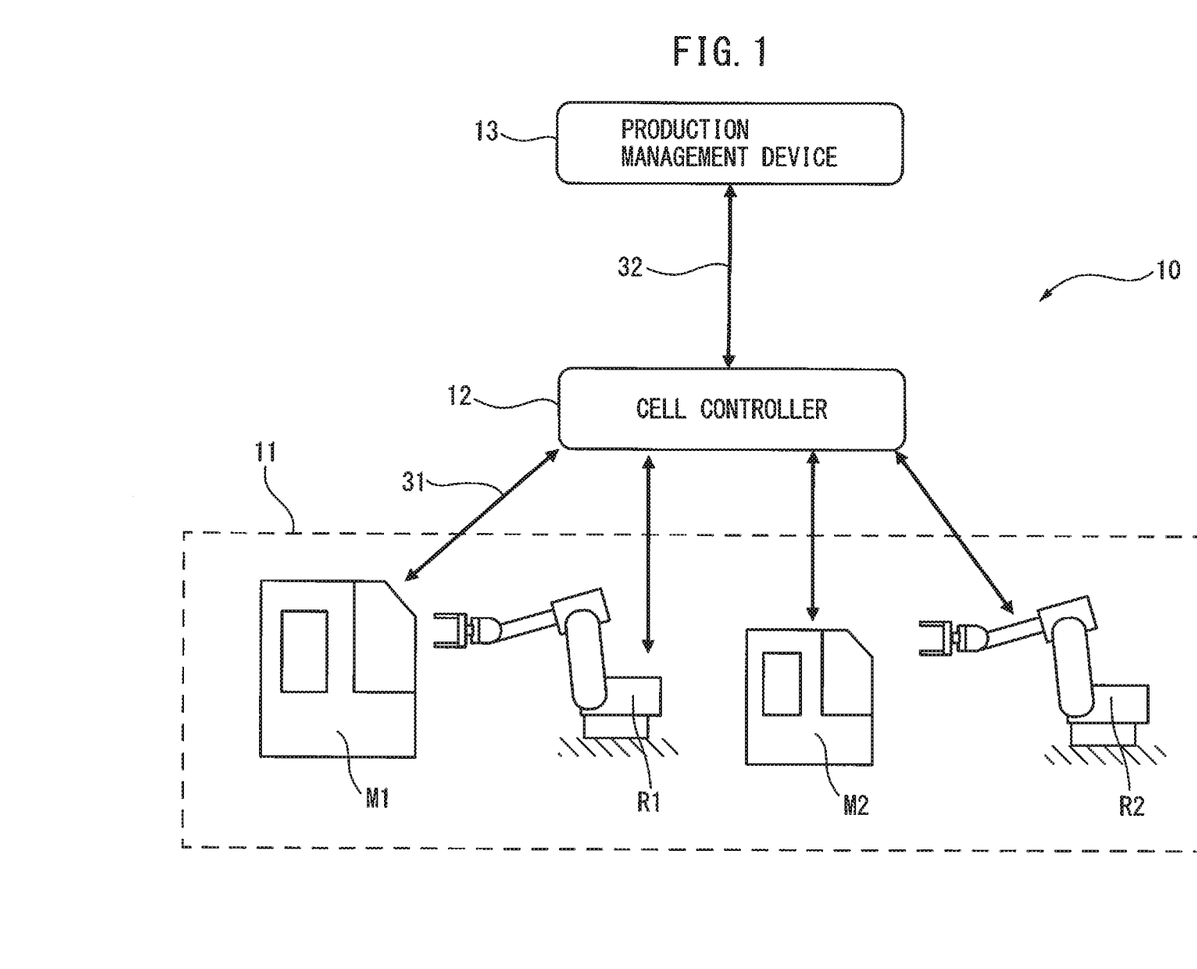
FIG. 1 is a block diagram schematically illustrating a production system provided with a cell controller according to an embodiment.

FIG. 1 is a block diagram simply illustrating a production system provided with a cell controller according to an embodiment.

With reference to FIG. 1, a production system 10 is provided with at least one manufacturing cell 11, a cell controller 12 for controlling the manufacturing cell 11, and a production management device 13.

The manufacturing cell 11 is disposed in a factory for manufacturing products. In contrast, the cell controller 12 and the production management device 13 are disposed in a building different from the factory. For example, the cell controller 12 may be disposed in another building within the factory site in which the manufacturing cell 11 is disposed. In this instance, it is preferable that the manufacturing cell 11 and the cell controller 12 are interconnected so that they can communicate with each other via a communication device 31, for example, an intranet.

The production management device 13 may, for example, be disposed in an office away from the factory. In this instance, it is preferable that the cell controller 12 and the production management device 13 are interconnected so that they can communicate with each other via a communication device 32, for example, the Internet. Further, it is preferable that a host computer for managing the working situation of a plurality of manufacturing cells 11 or manufacturing machines in the office is applied to the production management device 13 according to the present embodiment.

The manufacturing cell 11 is a set obtained by flexibly assembling a plurality of manufacturing machines for manufacturing products. The manufacturing cell 11 according to the present embodiment is constructed by a plurality of manufacturing machines including a machine tool M1, a robot R1, a machine tool M2, and a robot R2, as shown in FIG. 1. However, the number of manufacturing machines in the manufacturing cell 11 is not limited. The manufacturing cell 11 can be a manufacturing line in which a workpiece is successively processed, by a plurality of manufacturing machines, into a final product. Alternatively, the manufacturing cell 11 may be a manufacturing line in which two or more workpieces (parts) processed in each of two or more manufacturing machines are combined by another manufacturing machine in the middle of the process, in order to obtain a final product. Alternatively, in the invention of this application, two or more workpieces processed in two or more manufacturing cells 11 may be combined to obtain a final product.

Each manufacturing machine used in the present invention is not limited to a NC machine tool or an industrial robot. Examples of each manufacturing machine may include a PLC, a transfer machine, a measuring instrument, a testing device, a press machine, a press fitting machine, a printing machine, a die casting machine, an injection molding machine, a food machine, a packing machine, a welding machine, a washing machine, a painting machine, an assembling machine, a mounting machine, a wood working machine, a sealing device, or a cutting machine.

Further, it is preferable that the cell controller 12, and the machine tool M1, the robot R1, the machine tool M2, and the robot R2 are each constructed of a computer system (not shown) having a memory, such as a ROM or RAM, a CPU, and a communication control unit, which are interconnected via a bus line. Each communication control unit controls data passing among the cell controller 12 and the above manufacturing machines. It is preferable that the functions or operations of the cell controller 12 and the above manufacturing machines are each achieved by a program stored in each ROM, which is executed by the corresponding CPU.

Figure 2:
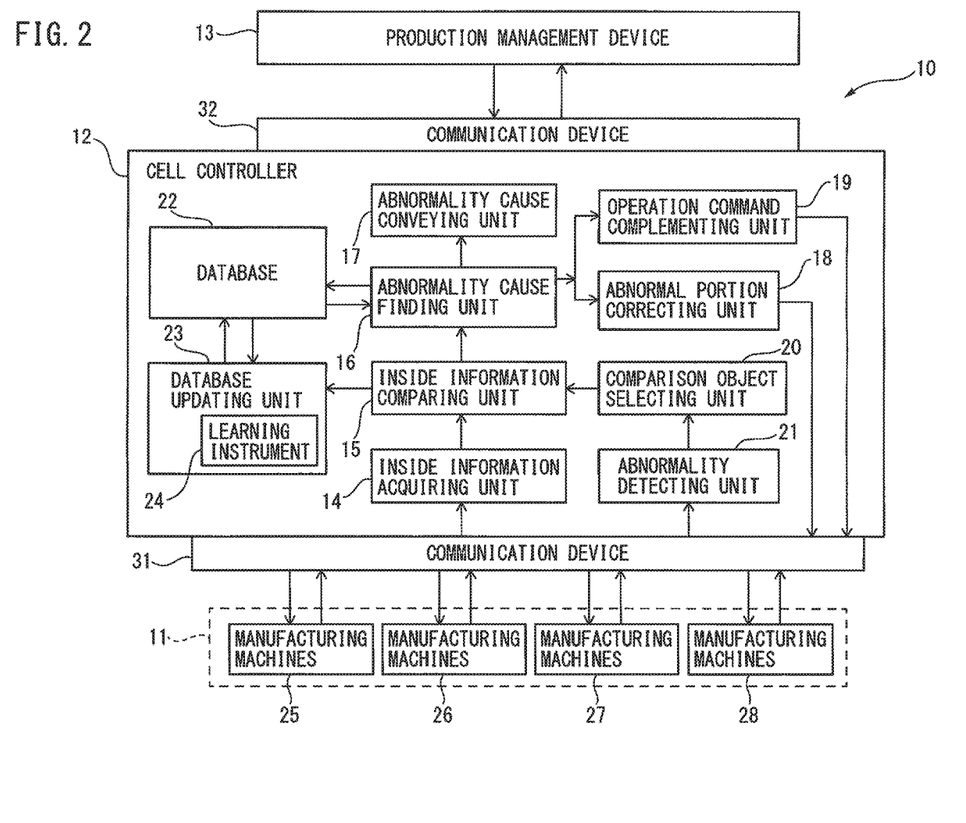
FIG. 2 is a block diagram more specifically illustrating the cell control system of the production system shown in FIG. 1.

The configuration of the cell controller 12 will be described in detail. FIG. 2 is a block diagram specifically illustrating the cell controller 12 of the production system 10 shown in FIG. 1.

As shown in FIG. 2, the cell controller 12 according to the present embodiment includes, as basic components, an inside information acquiring unit 14, an inside information comparing unit 15, an abnormality cause finding unit 16, and an abnormality cause conveying unit 17.

The inside information acquiring unit 14 acquires pieces of the inside information of a plurality of manufacturing machines 25 to 28 constituting the manufacturing cell 11, at given timings. Note that the machine tool M1, the robot R1, the machine tool M2, and the robot R2 shown in FIG. 1 respectively correspond to the manufacturing machines 25 to 28.

The inside information of each of the manufacturing machines 25 to 28 is the information stored in a memory of each manufacturing machine, and includes at least one of a drive parameter, a function parameter, an operation program, and an operation command log. Note that the memory for storing the inside information is not needed to be provided within each manufacturing machine as in the present embodiment. The memory may be provided out of each manufacturing machine, or may be provided in the cell controller 12.

Regarding a first manufacturing machine and a second manufacturing machine, which are selected from the manufacturing machines 25 to 28, the inside information comparing unit 15 compares first inside information and second inside information, which are respectively acquired from the first manufacturing machine and the second manufacturing machine by the inside information acquiring unit 14, thereby extracting a difference therebetween.

The abnormality cause finding unit 16 finds a cause of an abnormality that has occurred in the first manufacturing machine or the second manufacturing machine, or a cause of an abnormality that may occur in the future, based on the difference between the first inside information and the second inside information, which has been extracted by the inside information comparing unit 15. The abnormality cause conveying unit 17 conveys the cause of the abnormality, which has been found by the abnormality cause finding unit 16, to the outside of the cell controller 12. Examples of the conveying method include a conveying method using, for example, an indicator or a printing device.

In this respect, examples of the drive parameter, the function parameter, the operation program, and the operation command log, which are acquired as the inside information of the manufacturing machines, mainly include the following information.

The drive parameter is a parameter directly associated with driving of a manufacturing machine. In, for example, an articulated robot which is operated by a servomotor as a drive source, the drive parameter includes a pulse count at the mastering position of each axis of a robot, a servo-control parameter, etc. A robot control device controls peripheral equipment, for example, a hand to be driven by a servomotor or a spot welding gun in some cases, and accordingly, the drive parameter includes parameters associated with the driving of the peripheral equipment.

The function parameter is a parameter which should be set to operate a predetermined function included in a manufacturing machine. Examples of the function parameter include network setting information and signal allocating information, which are necessary when a manufacturing machine is connected to a cell controller and peripheral equipment via a field network, a software function, and a counter accessible from an operation program. Further, the function parameter includes a determination threshold value of an abnormality determination function included in a manufacturing machine, for example, the upper limit of torque of a servomotor, which is used to determine that an articulated robot operated by the servomotor as a drive source receives an excessive load.

The operation program is the information obtained by programming command processing for causing a manufacturing machine to perform a predetermined operation. In, for example, an articulated robot, the operation program includes information, for example, an operation command for moving an arm to an operation position, a command for transmitting a given signal to the outside, a command for reading the state of the given signal, etc. The operation program also includes the positional information of the operation position, and the number of a signal to be operated. Of course, any command, which can be registered in the program, is acceptable. In short, the present invention is not limited to the programming information described here as examples.

The operation command log (referred to also as "operation log") is the information obtained by recording, in each time series, key events received when an operator operates a manufacturing machine, or the manufacturing machine performs a given operation by itself. Examples of the operation command log include the log information of a key operation, which is input by the operator using an operation board of the manufacturing machine, and the screen information displayed on an indicator. Alternatively, the operation command log may be the information obtained by arranging, in time series, command processes performed when the operation program is executed.

As described above, the basic components of the cell controller 12 according to the present embodiment has been described. However, it is preferable that the present invention further includes various kinds of components that will be described below. In other words, it is preferable that, as shown in FIG. 2, an abnormal portion correcting unit 18, an operation command complementing unit 19, a comparison object selecting unit 20, an abnormality detecting unit 21, a database 22, a database updating unit 23, and a learning instrument 24 are further provided in the cell controller 12. The functions of these components will be successively described below.

When at least one of the drive parameter, the function parameter, and the operation program is a cause of an abnormality, the abnormal portion correcting unit 18 corrects a portion having the abnormality. When a deficiency in an operation command to a manufacturing machine is a cause of an abnormality, the operation command complementing unit 19 complements the operation command having the deficiency. When, for example, the difference between the operation command log in the first inside information and the operation command log in the second inside information generates a deficiency of the operation command in the first or second inside information, the operation command complementing unit 19 complements the deficiency of the operation command.

The comparison object selecting unit 20 selects the first manufacturing machine and the second manufacturing machine, which are to be compared in the inside information comparing unit 15, from the manufacturing machines 25 to 28. For example, the comparison object selecting unit 20 refers to device configuration information, which is associated with each manufacturing machine and which represents the components of the manufacturing machine, to compare pieces of the device configuration information with each other. Thus, the comparison object selecting unit 20 is configured to select the first manufacturing machine in which an abnormality occurs, and the second manufacturing machine having components similar to those of the first manufacturing machine. Alternatively, the comparison object selecting unit 20 may select the first manufacturing machine and the second manufacturing machine, which are to be compared, based on the registered information obtained by previously registering the correlation between the first manufacturing machine and the second manufacturing machine, which are similar to each other.

The abnormality detecting unit 21 is configured to detect the occurrence of an abnormality while monitoring the state of each of the manufacturing machines 25 to 28. The abnormality detecting unit 21 also conveys the information on which one of the manufacturing machines has an abnormality to the comparison object selecting unit 20. Such a function for detecting the occurrence of an abnormality may be included in the function of the comparison object selecting unit 20 without being separately provided as the abnormality detecting unit 21. Further, it is preferable that a plurality of sensors (not shown) is provided in each manufacturing machine, to detect various conditions of each of the manufacturing machines 25 to 28.

The database 22 is configured to store the state of an abnormality that has occurred in each manufacturing machine and a cause of the occurrence of the abnormality, which are correlated with each other. This enables the abnormality cause finding unit 16 to find, with reference to an abnormality cause management database, a cause of the abnormality which occurs in either the first manufacturing machine or the second manufacturing machine, or a cause of an abnormality which may occur in the future.

The database updating unit 23 is configured to update the information stored in the database 22. The database updating unit 23 inputs the state of the abnormality which has occurred in either the first manufacturing machine or the second manufacturing machine, and the difference between the first inside information and the second inside information, which is obtained by the inside information comparing unit 15 and which causes the abnormality at that time, to the database 22. In case that the production system 10 according to the present embodiment is provided with a plurality of cell controllers 12, it is preferable that a database sharing unit (not shown), for example, a server for sharing the database 22 between a cell controller 12 and another cell controller 12, is provided.

The learning instrument 24 is provided in the database updating unit 23. The learning instrument 24 learns a combination of the state of the abnormality which has occurred in each manufacturing machine with a cause of the occurrence of the abnormality, which is to be stored in the database 22.

However, the abnormal portion correcting unit 18, the operation command complementing unit 19, the comparison object selecting unit 20, the abnormality detecting unit 21, the database 22, the database updating unit 23, and the learning instrument 24 may be not necessarily provided in the cell controller according to the invention of this application.

The operation of the cell controller 12 according to the present embodiment will now be described with reference to FIG. 2.

Suppose that an abnormality occurs in the manufacturing machine 26 (i.e., the robot R1 shown in FIG. 1) of the manufacturing machines 25 to 28. This abnormality is detected by the abnormality detecting unit 21. This causes the comparison object selecting unit 20 to select the manufacturing machine 28 (i.e., the robot R2 shown in FIG. 1) having components similar to those of the manufacturing machine 26 from among the manufacturing machines 25 to 28.

When, in particular, the comparison object selecting unit 20 selects a manufacturing machine similar to the manufacturing machine 26, it discriminates the similarity of the manufacturing machine, using the identification information, e.g., model name registered in each manufacturing machine. For example, whether the model name of the robot R1 is identical to the model name of the robot R2 is confirmed. Alternatively, the information that the manufacturing machine 26 and the manufacturing machine 28 have similar configurations may be previously stored in the cell controller 12, and the similarity between the manufacturing machines may be discriminated. For example, the fact that the robot R1 and the robot R2 have similar configurations is previously registered in the comparison object selecting unit 20.

Subsequently, the inside information comparing unit 15 in the cell controller 12 compares the same kind of pieces in first inside information A acquired from the manufacturing machine 26 and second inside information B acquired from the manufacturing machine 28, thereby extracting a difference therebetween. Note that the inside information of the manufacturing machine 26 and the manufacturing machine 28 is previously acquired by the inside information acquiring unit 14.

Regarding the timing for acquiring the inside information, the inside information is acquired when an abnormality occurs in some embodiments, but it is preferable that the inside information is acquired at a predetermined interval when no abnormality occurs. This is effective when a severe abnormality occurs in a system of a manufacturing machine, and when it is difficult to acquire the inside information at the time of occurrence of the abnormality. When the inside information of a manufacturing machine is acquired at a predetermined interval, it is preferable that the inside information comparing unit 15 use the inside information acquired at a predetermined period of time before an abnormality occurs.

Subsequently, the abnormality cause finding unit 16 in the cell controller 12 analyzes the difference between the first inside information A and the second inside information B, which is extracted from the inside information comparing unit 15, thereby deciding a possible cause of the abnormality. In this respect, it is preferable that a possible cause of the abnormality is decided based on the information to be compared as in the following examples.

Suppose that, for example, the robot R1 as the manufacturing machine 26 abnormally operates, i.e., moves to a position different from the correct position for operation. In this instance, an operation program in first inside information A acquired from the manufacturing machine 26, i.e., the robot R1 and an operation program in the second inside information B acquired from the manufacturing machine 28, i.e., the robot R2 are compared. Consequently, if the positions for operation registered in the operation programs are different from each other, this difference in the position for operation is determined to be a cause of the abnormal operation.

Further, suppose that the order of execution of operation programs remaining in the operation command log in the first inside information A is, from the beginning, operation program no. 1, operation program no. 2, and operation program no. 3. In contrast, suppose that the order of execution of operation programs remaining in the operational log in the second inside information B is, from the beginning, operation program no. 2, operation program no. 1, and operation program no. 3. In this instance, the difference in the order of execution of operation programs is determined to be a cause of the abnormal operation.

Besides, any contents of the operation command log, which are to be compared, are acceptable as long as the contents cause some change in the state of a manufacturing machine, such as the contents of the operation in an operation board of the manufacturing machine, and the output of a signal from the outside.

Further, suppose that the drive parameters in the first inside information A and the drive parameters in the second inside information B are compared, and consequently, there is a difference in a servo control parameter, one of the drive parameters, in a given axis. In this instance, the difference in the control parameter is determined to be a cause of the abnormal operation. Examples of the drive parameters include control gains in a motor in each joint axis in an articulated robot, mastering counts, and acceleration/deceleration time constants.

The abnormality cause finding unit 16 may refer to the database 22, which correlates and stores the state of an abnormality occurring in each of the manufacturing machines 25 to 28 and a cause of the occurrence of the abnormality when deciding a possible cause of the abnormality as described above. It is preferable that the database 22 is not only used independently in a single cell controller 12 but also shared with other databases 22 in a plurality of cell controllers 12 via a network.

Subsequently, the abnormality cause conveying unit 17 in the cell controller 12 conveys the cause of the abnormality, which has been found by the abnormality cause finding unit 16, to the outside of the cell controller 12. In this respect, an output unit (not shown), such as a display instrument or a printing device connected to the cell controller 12 is conveyed of the cause of the abnormality. Further, the cause of the abnormality is conveyed to, for example, the manufacturing machines 25 to 28 connected to the cell controller 12 via the communication device 31, or the production management device 13 connected to the cell controller 12 via a communication device 32.

The operator recovers the manufacturing machine 26 in which an abnormality occurs, based on the information on the cause of the abnormality, which has been conveyed from the abnormality cause conveying unit 17.

When the manufacturing machine 26 is recovered, the abnormal portion correcting unit 18 in the cell controller 12 instead of the operator may access the manufacturing machine 26, in order to correct parameters and the like which cause an abnormality. Alternatively, if there is a deficiency in the operation procedure of the manufacturing machine 26, the operation command complementing unit 19 in the cell controller 12 may automatically complement the operation.

Suppose that, for example, maintenance programs should be periodically activated in two similar robots R1 and R2. In this instance, in some cases, a maintenance program is activated for the robot R1, but a maintenance program is not activated for the robot R2, and the robot R2 continues to produce products. In this respect, the inside information comparing unit 15 and the abnormality cause finding unit 16 in the present embodiment compares the operational logs of the robots R1 and R2 before the continuation of production in the robot R2, thereby finding an error in activation of the maintenance program. Then the operation command complementing unit 19 automatically activates the maintenance program for the robot R2 before the continuation of production in the robot R2.

It is preferable that, as operations associated with the recovery of the manufacturing machine 26, the state of an abnormality that occurs this time in the manufacturing machine 26, and the difference between the first inside information A and the second inside information B, which causes the abnormality, are reflected in the database 22. Such update of the information of the database 22 may be performed by the operator's input, or may be automatically performed by the database updating unit 23.

Further, when the information of the database 22 is automatically updated by the database updating unit 23, it is preferable that the learning instrument 24 performs machine learning. The learning instrument 24 performs machine learning, for example, unsupervised learning, using the information accumulated in the database 22, the inside information acquired by the inside information acquiring unit 14, or the device configuration information representing the components of a manufacturing machine. Then the database updating unit 23 newly generates a correspondence relationship between an abnormality, which is not registered in the database 22 and does not yet occur, and a cause of the abnormality, based on results of the learning, thereby updating the database 22.

Suppose that, for example, an abnormal event, in which a first axis of the robot R1, a 6-axis articulated robot, does not normally operate, has occurred in the past, and the robot R1 and the robot R2 having components similar to those of the robot R1 have been compared. Suppose that there is a difference in the servo-control parameter of the first axis, as a comparison result at that time, and the difference cause the abnormality. Suppose that the learning instrument 24 obtains a result of learning, i.e., the fact that the similar abnormal event can occur in axis other than the first axis, from the information on such a difference, and the device configuration information representing that the manufacturing machine is a 6-axis articulated robot. This result of learning causes the database updating unit 23 to newly register the information, in which an abnormal event that a second axis does not normally operate is caused by the servo-control parameter of the second axis, to the database 22.

Further, suppose that machine learning is performed using the operation command log in the inside information of the robot R1, and evidence that the servo-control parameter of the first axis has been rewritten by the operator in the past is found. In this instance, another result of learning, in which direct causes of the abnormal movement include not only servo-control parameters but also incorrect operations of the operator, can be obtained. Thus, the database updating unit 23 newly registers the information of the incorrect operations to the database 22. As described above, a plurality of pieces of information are analyzed from many directions by machine learning, so that the information of the database 22 can be upgraded.

As described above, the cell controller 12 according to the present embodiment acquires various kinds of inside information of a manufacturing machine, such as parameters or operational logs of the manufacturing machine by communicating with the manufacturing machines 25 to 28 via a network. Further, regarding the manufacturing machine 26 having an abnormality and the manufacturing machine 28, which is similar to the manufacturing machine 26 and which normally operates, various kinds of pieces of the inside information are compared, and a difference therebetween is analyzed. Further, a cause of the abnormality is early found from a result of the analysis, and assistance for quickly recovering the manufacturing machine 26 having the abnormality, for example, alarm output to the outside, correction of an abnormal portion, supplement to an operation command, etc. Such methods enable finding of a cause of an abnormality which occurs in a manufacturing machine, or a cause of an abnormality which may occur in the future, in particular, a cause of an abnormality caused by the inside information of a manufacturing machine.

In particular, the inside information acquiring unit 14 periodically acquires the inside information of the manufacturing machines 25 to 28 in which no abnormality occurs, and the inside information comparing unit 15 successively compares pieces of the inside information of two similar manufacturing machines 26 and 28, which has been periodically acquired. When the inside information comparing unit 15 finds a difference, which does not yet cause an abnormality, but will probably cause an abnormality in the future, the difference is conveyed to the outside of the cell controller 12. This prevents an abnormality caused by the inside information of a manufacturing machine from occurring.

The learning instrument 24 (hereinafter referred to as "machine learning apparatus) will now be described in detail. The machine learning apparatus has a function for analytically extracting useful rules or knowledge representations, criteria for determination, etc. from the assembly of data inputted to the apparatus, and a function for outputting the results of determination, and learning knowledges. There are various machine learning methods, and the methods are roughly divided into "supervised learning", "unsupervised learning", and "reinforcement learning". In order to achieve these leaning methods, there is another method referred to as "deep learning" for learning extraction of feature quantity itself.

"Supervised learning" is a method in which a large volume of input-output (label) paired data are given to a machine learning apparatus, so that characteristics of these datasets can be learned, and a model for inferring an output value from input data, i.e., the input-output relation can be inductively acquired. This can be achieved using an algorithm, for example, a neural network that will be described later.

"Unsupervised learning" is a method in which a large volume of input-only data are given to a machine learning apparatus, so that the distribution of the input data can be learned, and a device for, for example, compressing, classifying, and fairing the input data can be learned even if the corresponding teacher output data are not given. For example, characteristics of these datasets can be clustered based on their similarity. The result obtained from the learning is used to set a certain criterion, and then, the allocation of output is performed so as to optimize the criterion, so that the prediction of output can be achieved. There is another problem setting method situated between "unsupervised learning" and "supervised learning", which is known as "semi-supervised learning". In this learning method, a small volume of input-output paired data and a large volume of input-only data are provided.

Problems are set in reinforcement learning as follows.
A machine learning apparatus observes the state of environment, and decides an action.
The environment varies in accordance with some rules, and your action can vary the environment.
A reward signal is returned at each action.
The target of maximization is the sum of (discount) rewards to be obtained now and in the future.
Learning starts from the state in which a result caused by an action is completely unknown, or is incompletely known. The machine learning apparatus can acquire the result as data only after it actually starts operating. In other words, it is necessary to search the optimal action through trial and error.
It is also possible to set, as an initial state, the state, in which a prior learning (e.g., the above supervised learning, or inverse reinforcement learning) is performed so as to emulate the action of a person, and start learning from an appropriate starting point.

"Reinforcement learning" is a learning method for learning not only determinations or classifications but also actions, to learn an appropriate action based on the interaction of environment to an action, i.e., an action to maximize rewards to be obtained in the future. This indicates, in the present embodiment, that an action, which can exert an effect on the future, can be acquired. The explanation of reinforcement learning will be continued below using, for example, Q-learning, but reinforcement learning is not limited to Q-learning.

Q-learning is a method for learning a value Q(s, a) at which an action a is selected under an environmental state s. In other words, it is only required that the action a having the highest value Q(s, a) is selected as an optimal action a, under a given state s. However, initially, the correct value of the value Q(s, a) for a combination of the state s and the action a is completely unknown. Then, the agent (the subject of an action) selects various actions a under a given state s, and gives rewards to the actions a at that time. Thus, the agent learns selection of a more beneficial action, i.e., the correct value Q(s, a).

As a result of the action, maximization of the sum of rewards to be obtained in the future is desired, and accordingly, $Q(s, a) = E[\Sigma \gamma^t r_t]$ is aimed to be finally achieved (An expected value is set for the time when the state varies in accordance with the optimal action. As a matter of course, the expected value is unknown, and accordingly, should be learned while being searched). The update expression for such a value Q(s, a) is given, for example, by:

$$Q(s_t, a_t) \leftarrow Q(s_t, a_t) + \alpha \left( r_{t+1} + \gamma \max_a Q(s_{t+1}, a) - Q(s_t, a_t) \right) \quad \text{Equation (1)}$$

where $s_t$ is the state of environment at time t, and $a_t$ is the action at time t. Upon the action $a_t$, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by $\gamma$. $\gamma$ is the parameter having a range of $0 < \gamma \le 1$, and is called discount rate. $\alpha$ is the learning factor, and has a range of $0 < \alpha \le 1$.

This equation expresses a method for updating an evaluation value $Q(s_t, a_t)$ of an action $a_t$ in a state $s_t$ based on a reward $r_{t+1}$ which has been returned as a result of a trial $a_t$. If an evaluation value $Q(s_{t+1}, \max a_{t+1})$ of the optimal action max a in a subsequent state caused by the reward $r_{t+1}$+ the action a is greater than the evaluation value $Q(s_t, a_t)$ of the action a in the state s, $Q(s_t, a_t)$ is increased. In the contrary case, i.e., the evaluation value $Q(s_{t+1}, \max a_{t+1})$ is smaller than the evaluation value $Q(s_t, a_t)$, $Q(s_t, a_t)$ is decreased. In other words, the value of a given action in a given state is tried to approach the reward immediately returned as a result, and the value of an optimal action in the subsequent state caused by the given action.

Examples of the method for expressing Q(s, a) on a computer include a method for preserving the values of all state action pairs (s, a) as a table (action-value table), and a method for preparing a function to approximate Q(s, a). In the latter method, the above update expression can be achieved by adjusting a parameter of the approximate function using a method, such as stochastic gradient descent. Examples of the approximate function include a neural network that will be described later.

Figure 3:
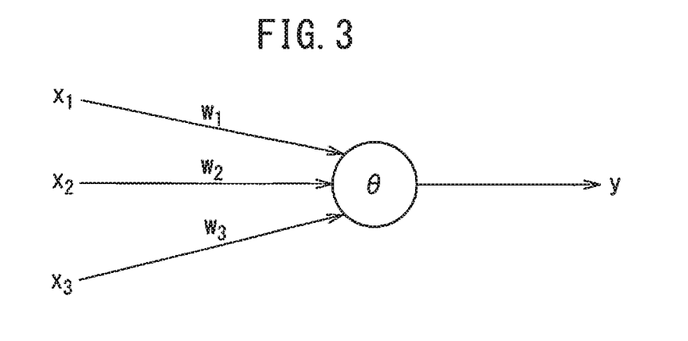
FIG. 3 is a schematic diagram of a neuron model.

As an approximate algorithm of a value function in supervised learning, unsupervised learning, and reinforcement learning, a neural network can be used. The neural network is comprised of, for example, an arithmetic device and a memory, which realize a neural network simulating a neuron model as shown in FIG. 3. FIG. 3 is a schematic diagram illustrating a neuron model.

As shown in FIG. 3, a neuron outputs an output y in response to a plurality of inputs x (inputs x1 to x3 are provided herein as an example). Weights w (w1 to w3) are applied to the corresponding inputs x1 to x3. This causes the neuron to output the output y that is expressed by the equation below. Note that the inputs x, the output y, and the weights w are vectors.

$$y = f_k\left(\Sigma_{i=1}^n x_i w_i - \theta\right)$$

where $\theta$ is the bias, and $f_k$ is the activation function.

Figure 4:
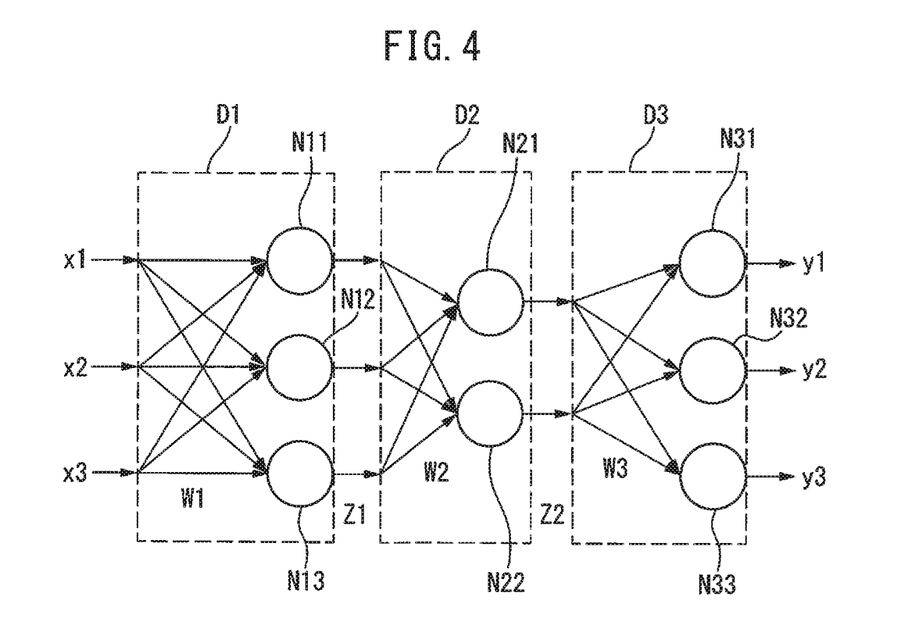
FIG. 4 is a schematic diagram of a three-layered neural network.

A three-layer weighted neural network comprised of a combination of neurons as described above will now be described below with reference to FIG. 4. FIG. 4 is a schematic diagram illustrating a weighted neural network having three layers D1 to D3.

As shown in FIG. 4, a plurality of inputs x (inputs x1 to x3 are provided herein as an example) are inputted from the left side of the neural network, and results y (results y1 to y3 are provided herein as an example) are outputted from the right side of the neural network.

Specifically, the inputs x1 to x3, to which the corresponding weights have been applied, are respectively inputted to three neurons N11 to N13. These weights applied to the inputs are collectively designated by w1.

The neurons N11 to N13 respectively output z11 to z13. These z11 to z13 are collectively designated by a feature vector z1, and can be treated as a vector obtained by extracting a feature amount of an input vector. This feature vector z1 is a feature vector between the weight w1 and the weight w2.

The feature vectors z11 to z13, to which the corresponding weights have been applied, are inputted to two neurons N21 and N22. These weights applied to the feature vectors are collectively designated by w2.

The neurons N21 and N22 respectively output z21 and z22. These z21 and z22 are collectively designated by a feature vector z2. This feature vector z2 is a feature vector between the weight w2 and the weight w3.

The feature vectors z21 and z22, to which the corresponding weights have been applied, are inputted to three neurons N31 to N33. These weights applied to the feature vectors are collectively designated by w3.

Finally, the neurons N31 to N33 respectively output the results y1 to y3.

The operation of the neural network includes a learning mode and a value prediction mode. A learning dataset is used to learn the weights w in the learning mode, and parameters obtained from the learning are used to determine the action of the processing machine in the prediction mode (For convenience, the term "prediction" is used herein, but various tasks including detection, classification, deduction, etc. can be performed).

It is possible to perform not only learning (online learning), in which data that have been acquired by actually operating the processing machine in the prediction mode are immediately learned, and are reflected in a subsequent action, but also learning (batch learning), in which previously collected data are collectively learned using a group of the data, and thereafter, a detection mode is performed using parameters obtained from the learning. Another learning mode can be interposed every time a predetermined amount of data is collected.

The weights w1 to w3 can be learned by an error back propagation method. The information on errors is introduced from the right side to the left side. The error back propagation method is a method for adjusting (learning) each weight so as to reduce a difference between the output y when the input x is inputted and the true output y (teacher) in each neuron.

In such a neural network, three or more layers can be provided (This is called deep learning). An arithmetic device, which extracts features from input data, in a stepwise fashion, so as to return a result, can be automatically acquired from only teacher data.

Note that unsupervised learning, a method of machine learning, is applied to the learning instrument 24 shown in FIG. 2. Of course, the machine learning method applicable to the learning instrument 24 is not limited to unsupervised learning. When, for example, supervised learning is applied to the learning instrument 24, the value functions correspond to learning models, and the rewards correspond to errors.

The present invention has been described above using exemplary embodiments. However, a person skilled in the art would understand that the aforementioned modifications and various other modifications, omissions, and additions can be made without departing from the scope of the present invention.

Effect of the Invention

According to the first aspect, a cause of an abnormality that occurs in a manufacturing machine, or a cause of an abnormality that may occur in the future, in particular, a cause of an abnormality caused by the inside information of a manufacturing machine can be efficiently found. According to the second aspect of the present invention, useful information to find a cause of an abnormality can be acquired. According to the third and fourth aspects of the present invention, when a cause of an abnormality is found, a portion which causes the abnormality can be automatically corrected.

According to the fifth aspect of the present invention, when a cause of an abnormality in an operational log is found, a lacking operation can be automatically added. According to the sixth and seventh aspects of the present invention, a manufacturing machine to be compared can be easily selected.

According to the eighth aspect of the present invention, even when a severe abnormality occurs in a manufacturing machine, and the inside information acquiring unit cannot acquire the information from the manufacturing machine, the information acquired in a predetermined period of time before the occurrence of the abnormality can be used.

According to the ninth aspect of the present invention, the accuracy in finding a cause of an abnormality can be improved by referring to the information of the database. According to the tenth aspect of the present invention, the accuracy in finding a cause of an abnormality can be further improved by updating the database. According to the eleventh aspect of the present invention, the accuracy in finding a cause of an abnormality can be still further improved by sharing the information of the database with a plurality of cell controllers. According to the twelfth aspect of the present invention, the information of the database can be spontaneously improved by reflecting the correspondence relationship between an abnormality of a manufacturing machine and a cause of the abnormality, which is obtained from a result of machine learning, in the database.

What is claimed is:

1. A cell controller for controlling a plurality of manufacturing machines constituting a manufacturing cell, the cell controller comprising a processor configured to:

acquire inside information of the plurality of manufacturing machines,     when an abnormality occurs in a first manufacturing machine of the plurality of manufacturing machines, select         the first manufacturing machine, and         from among the plurality of manufacturing machines, a second manufacturing machine which has components similar to those of the first manufacturing machine and which normally operates,     with regard to the selected first manufacturing machine and the selected second manufacturing machine,         compare acquired first inside information of the first manufacturing machine and acquired second inside information of the second manufacturing machine, and         extract a difference between the first inside information of the first manufacturing machine and the second inside information of the second manufacturing machine,     determine a cause of the abnormality that occurs in the first manufacturing machine or a cause of an abnormality that may occur in the future, based on the extracted difference between the first inside information and the second inside information, and     convey the determined cause of the abnormality to the outside of the cell controller,     wherein the first manufacturing machine in which the abnormality occurs is recovered based on the conveyed cause of the abnormality.

2. The cell controller according to claim 1, wherein the inside information of each manufacturing machine includes at least one of     a drive parameter associated with driving of said each manufacturing machine,     a function parameter associated with the function of said each manufacturing machine,     an operation program to be executed by said each manufacturing machine, and     an operation command log obtained by recording, in time series, operation commands received to cause said each manufacturing machine to perform a predetermined operation.

3. The cell controller according to claim 2, wherein the processor is further configured to correct, when at least one of the drive parameter, the function parameter, and the operation program is a cause of the abnormality, a portion having the abnormality.

4. The cell controller according to claim 2, wherein the operation command log is information obtained by recording, in time series, operator's operations, operation program executing processes, input of signals to the outside, or operation commands generated by input of signals from the outside.

5. The cell controller according to claim 2, wherein the processor is further configured to complement, when a lack of either an operation command log in the first inside information or an operation command log in the second inside information causes the abnormality, an operation according to an operation command lacking in the operation command log, with respect to the manufacturing machine which lacks the operation command log.

6. The cell controller according to claim 1, wherein the processor is configured to     refer to device configuration information representing components of each of the manufacturing machines, and compare the device configuration information of the manufacturing machines with each other for selecting the first manufacturing machine and the second manufacturing machine.

7. The cell controller according to claim 1, wherein the processor is configured to select the first manufacturing machine and the second manufacturing machine, based on registration information obtained by previously correlating the first manufacturing machine and the second manufacturing machine, which are similar to each other.

8. The cell controller according to claim 1, wherein the processor is configured to acquire the inside information of the manufacturing machines at a predetermined interval.

9. The cell controller according to claim 1, further comprising:
 a database which is configured to correlate and store a state of an abnormality that occurs in each of the manufacturing machines and an cause of the occurrence of the abnormality,
 wherein the processor is configured to refer to the database for finding a cause of an abnormality that occurs in the first manufacturing machine, or a cause of an abnormality that may occur in the future.

10. The cell controller according to claim 9, wherein the processor is further configured to reflect in the database,
 the state of an abnormality that occurs in either the first manufacturing machine or the second manufacturing machine, and
 the extracted difference between the first inside information and the second inside information, which causes the abnormality.

11. The cell controller according to claim 9, wherein
 the cell controller is one of a plurality of the cell controllers, and
 the processor is further configured to share the database with the other cell controllers.

12. The cell controller according to claim 9, further comprising a learning instrument which is configured to perform machine learning using the information stored in the database, the acquired inside information of each of the manufacturing machines, and device configuration information representing components of each of the manufacturing machines, in order to update the information stored in the database.

* * * * *